United States Patent Office 2,870,218

Patented Jan. 20, 1959

2,870,218

METHOD OF PREPARING 2,2,2-TRIFLUORO-ETHYL VINYL ETHER

Palmer W. Townsend, Florham Park, N. J., assignor to Air Reduction Company, Incorporated, New York, N. Y., a corporation of New York No Drawing. Application August 15, 1955 Serial No. 528,552

6 Claims. (Cl. 260—614)

This invention relates to the production of 2,2,2-trifluoroethyl vinyl ether by the catalytic dealcoholysis of di-(2,2,2-trifluoroethyl) acetaldehyde acetal. The reaction may be represented as follows:

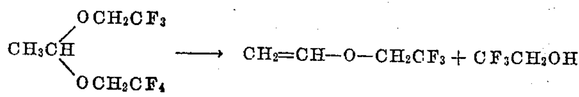

According to the present invention 2,2,2-trifluoroethyl vinyl ether is obtained by the catalytic dealcoholysis of di-(2,2,2-trifluoroethyl) acetaldehyde acetal by a process in which the acetal is maintained at an elevated temperature in the presence of a fluidized clay catalyst. The clay catalyst, preferably used, is a clay of the montmorillonite group, composed essentially of silica and alumina as the major constituents, which is activated, such as by treatment with an acid, as described in the patent to H. S. Miller, No. 2,378,236.

It has been found that by carrying out this reaction in the manner above described, exceptionally high, sustained conversions with excellent yields are obtained while at the same time affording an extremely long, effective life of the catalyst. For example, it has been possible, according to this method, to obtain conversions as high as 80 to 90% in a single pass with yields of 90 to 98% of theoretical. Accordingly, the method affords extremely beneficial advantages in terms of convenience of operation, maintenance of consistently high quality of product, and economy.

Most effective fluidization of the catalyst is achieved when the catalyst is employed in finely divided form, for example, in the range 1 to 100 microns particle size.

In carrying out the process according to the invention, the reaction zone in which the finely divided catalyst is contained may be maintained at a temperature of 100° C. to 350° C. and, preferably, is maintained in the range of 240° C. to 280° C. In a preferred mode of operation, the vapors of di-(2,2,2-trifluoroethyl) acetaldehyde acetal are passed upwardly through a bed of the finely divided catalyst and the feed rate thereof controlled such as to produce the desired degree of fluidization. Fluidization occurs, as is well known to those skilled in the art, when the velocity of the fluidizing gas is increased to the point where the pressure drop in the bed becomes equivalent to or slightly in excess of the weight of the solids present, such that the solids become suspended in the gas stream. Further variation of the gas velocity affects the degree of fluidization, slightly higher velocities tending to produce expansion of the bed, as is well understood. Preferably, the acetal vapors are delivered at feed rates of from 300 to 800 lbs. of acetal per hour for each square foot cross-sectional area of the bed. The catalyst bed, measured at static conditions, is preferably provided in depths of less than five feet and, more preferably, at depths of from 1½ to five feet. Upon fluidization the corresponding bed depth is approximately twice the bed depth under static conditions. Under the preferred operating conditions, the residence time of the acetal vapor in the catalyst bed is between approximately 2 and 20 seconds. These conditions may also be expressed in terms of space velocity of the acetal which is defined as the volume of acetal vapor delivered per hour per unit volume of the catalyst, based upon the ideal gaseous volume at reactor conditions and determination of the bed volume at static conditions. For the preferred ranges of feed rate and bed depths described above, the corresponding range of space velocity of the acetal is 200 to 5400. When carrying out the reaction within the preferred ranges of operating conditions, suitable fluidization of the catalyst is achieved while attaining high conversions and yields. Conversions greater than those resulting under the conditions above described, may be obtained by the use of lower feed rates and/or deeper catalyst beds which, in effect, produce longer residence times of the acetal vapor. However, such conditions normally are also accompanied by decomposition of some of the 2,2,2-trifluoroethyl vinyl ether product, particularly at the upper range of the reaction temperatures, with a corresponding decrease in yield.

The 2,2,2-trifluoroethyl vinyl ether product is obtained by condensation of the gaseous products leaving the fluidized reactor followed by fractional distillation.

It has been noted that upon contacting the di-(2,2,2-trifluoroethyl) acetaldehyde acetal vapor with the fluidized catalyst at reaction temperatures, an initial exothermic reaction takes place during which the catalyst becomes carbonized. Apparently, during this initial phase, which is followed rapidly by a change to an endothermic reaction with the production of the desired ether, total decomposition of the acetal occurs in the presence of the catalyst, resulting in the deposition of organic decomposition products thereon. Such carbonization, it is believed, serves to condition the catalyst for the promotion of the desired dealcoholysis reaction, which then proceeds without the accompaniment of substantially any further total decomposition of the acetal after the reaction becomes endothermic. Carbonization of the catalyst may also be accomplished, preliminarily to the treatment of the acetal by passing any other suitable gaseous organic compound, capable of being cracked, through the bed, in a manner effective to cause cracking thereof and deposition of the carbonaceous decomposition products on the catalyst. For example, ethane, di-ethyl acetal, ethanol, ethylene and similar compounds may be used.

The di-(2,2,2-trifluoroethyl) acetaldehyde acetal starting material used herein may be prepared by the reaction of acetylene with 2,2,2-trifluoroethanol in the presence of a mercury catalyst such as mercuric oxide and a strongly acid substance such as boron trifluoride ethyl etherate complex, as described in further detail in the U. S. application Serial No. 528,556 of L. Speers Croix, filed on August 15, 1955, entitled "Preparation of 2,2,2-Trifluoroethyl Vinyl Ether," filed concurrently herewith, and assigned to the assignee of the present application.

The following example will serve to illustrate the invention:

A fluidized catalytic reactor was used, consisting of an electrically heated, 4½ foot section of a vertical 2" steel pipe, equipped with a suitable inlet gas disperser and a pair of conventional, porous, stainless steel, bayonet, exit gas filters. The exit filters were arranged to discharge the gaseous products alternately and were equipped with connections to permit blow-back with nitrogen during the alternating, off-intervals so as to avoid clogging by entrained particles, as is well known. The discharge outlet of the reactor was connected to a water cooled condenser in which the reaction products were collected. Liquid acetal was delivered from a supply reservoir through a flowmeter and an adjustable needle valve for controlling the feed rate, to a vaporizer maintained at a temperature of approximately 150° C. and thence to a preheater to raise the acetal vapors to the reaction temperature. The acetal vapors were delivered from the preheater to the inlet of the reactor at pressures slightly bove atmospheric pressure, of about 1 to 15 p. s. i. g., sufficient to pass the vapors through the catalyst bed at the desired linear velocities.

The reactor, described above, was charged with 1½ lbs. of thoroughly dry Super-Filtrol, Grade 1 Absorbent, which is a specific grade of acid-activated montmorillonite clay sold by the Filtrol Corporation, Los Angeles, California. This grade is of fine particle size, 10% of the particles having a 0 to 20 micron diameter and all of the material used being capable of passing a 150 mesh screen (Tyler standard). With the reactor maintained at 270° to 275° C., the heated vapor of di-(2,2,2-trifluoroethyl) acetaldehyde acetal was passed upwardly through the reactor at a rate of 15 lbs. per hour. A total of 61 lbs. of acetal was passed through the catalytic reactor in this manner. Upon fractional distillation of the condensate obtained from the reactor, there was separated, 40.5% by weight of the crude 2,2,2-trifluoroethyl vinyl ether product, B. P. 44°–45° C.; 39.4% by weight of 2,2,2-trifluoroethanol suitable for recycling to prepare the acetal starting material; and 20.1% of unreacted acetal suitable for recycling, together with a small amount of other by-products. The conversion was 73% and the yield was about 95% of the theoretical.

The crude 2,2,2-trifluoroethyl vinyl ether obtained above, is preferably further subjected to a purification treatment. In such treatment the ether is washed with an aqueous alkaline solution, such as sodium hydroxide solution, separated and dried, heated at reflux temperature over alkali pellets, such as potassium hydroxide, to insure the removal of any aldehydes, 2,2,2-trifluoroethanol or water that may be present, and finally fractionally distilled to give the substantially pure ether B. P. 42.5° C./751 mm.; $n_D^{20}=1.3192$. The 2,2,2-trifluoroethyl vinyl ether product is a useful monomer from which relatively high molecular weight, form-stable, non-tacky polymers may be obtained, as described in the application, Serial No. 409,057, of C. E. Schildknecht, filed on February 8, 1954, now Patent No. 2,820,025; and, when in suitably pure form after purification as above described, also is useful as a general inhalation anesthetic, as described in application, Serial No. 357,901, of J. G. Shukys, filed on May 27, 1953, now Patent No. 2,830,007. Both of the above applications are assigned to the assignee of the present application.

It will be seen that various changes may be made in the details of the method herein above described, without departing from the scope, or sacrificing any of the advantages, of the present invention, defined in the following claims.

I claim:

1. The method for the preparation of 2,2,2-trifluoroethyl vinyl ether which comprises passing the vapor of di-(2,2,2-trifluoroethyl) acetaldehyde acetal upwardly through a catalyst bed comprising an acid-activated clay in finely divided form, while maintaining said acetal at an elevated temperature, and delivering said acetal at a rate effective to maintain said catalyst bed in a fluidized state.

2. The method for the preparation of 2,2,2-trifluoroethyl vinyl ether which comprises maintaining di-(2,2,2-trifluoroethyl) acetaldehyde acetal at a temperature of 100° C. to 350° C., in the presence of an acid-activated clay of the montmorillonite group maintained in a fluidized state, and separating 2,2,2-trifluoroethyl vinyl ether therefrom.

3. The method according to claim 2 wherein said acetal is delivered at a rate of 300 to 800 lbs. per hour for each square foot cross-sectional area of the catalyst bed.

4. The method for the preparation of 2,2,2-trifluoroethyl vinyl ether which comprises passing the vapor of di-(2,2,2-trifluoroethyl) acetaldehyde acetal upwardly through a catalyst bed comprising a finely divided acid-activated clay of the montmorillonite group, at a rate effective to fluidize said catalyst and maintaining the reaction temperature at 240° C. to 280° C.

5. The method for the preparation of 2,2,2-trifluoroethyl vinyl ether which comprises maintaining di-(2,2,2-trifluoroethyl) acetaldehyde acetal at an elevated temperature in the presence of a clay of the montmorillonite group as a catalyst maintained in a fluidized state, and separating 2,2,2-trifluoroethyl vinyl ether therefrom.

6. The method for the preparation of 2,2,2-trifluoroethyl vinyl ether which comprises passing the vapor of di-(2,2,2-trifluoroethyl) acetaldehyde acetal upwardly through a catalyst bed comprising an acid-activated clay of the montmorillonite group in finally divided form, while maintaining said acetal at an elevated temperature and delivering said acetal at a rate effective to maintain said catalyst bed in a fluidized state.

References Cited in the file of this patent

UNITED STATES PATENTS 1,902,169 Herrmann et al. -------- Mar. 21, 1933
2,378,236 Miller ---------------- June 12, 1945

FOREIGN PATENTS 672,511 Great Britain ------------ May 21, 1952

OTHER REFERENCES

Krantz et al.: Chemical Abstracts, vol. 47, col. 9498, 11,523 (1945); vol. 48, col. 332, 1584 (1955).

UNITED STATES PATENT OFFICE
CERTIFICATE OF CORRECTION

January 20, 1959

Patent No. 2,870,218

Palmer W. Townsend

It is hereby certified that error appears in the printed specification of the above numbered patent requiring correction and that the said Letters Patent should read as corrected below.

Column 1, line 21, for the portion of the formula reading "$OCH_2CF_4$" read -- $OCH_2CF_3$ --; column 3, line 3, for "bove" read -- above --.

Signed and sealed this 19th day of May 1959.

(SEAL)
Attest:

KARL H. AXLINE

Attesting Officer

ROBERT C. WATSON
Commissioner of Patents